Nov. 14, 1972    R. M. WILLIAMS    3,702,682

MATERIAL SEPARATOR APPARATUS

Filed March 5, 1971

United States Patent Office 3,702,682
Patented Nov. 14, 1972

3,702,682
MATERIAL SEPARATOR APPARATUS
Robert M. Williams, Ladue, Mo., assignor to Williams Patent Crusher & Pulverizer Co., Inc., St. Louis, Mo.
Filed Mar. 5, 1971, Ser. No. 121,495
Int. Cl. B02c 13/288
U.S. Cl. 241—48
10 Claims

ABSTRACT OF THE DISCLOSURE

Apparatus for separating material having classifications that are different depending on specific gravity as well as buoyancy or responsiveness to air flow entrainment. The apparatus is useful to classify material resulting from shredding old automobiles into recoverable metals, usually non-ferrous solids, and non-metallic wastes, like dirt, cotton, fabrics, glass, plastics, and similar materials. In operation a primary fan induced circulation system is operated at a controlled flow rate to allow gravity fall-out separation of the heavier metallic material in the primary system, while the lighter and usually non-metallic material is collected at several zones, with one zone at a suitable negative pressure capable of forceably scrubbing and separating metallic from the non-metallic materials and returning the metallic material to the system for recycling until the desired separation is obtained.

BACKGROUND OF THE INVENTION

This invention relates to material separator apparatus in which metallic and non-metallic material may be separated according to characteristics that identify the same as belonging to different classes.

The disposal of old automobiles, as one example, is and has been a serious problem, and it will continue to be a serious problem in view of the ever increasing volume of production. Not much of a significant character has been done to overcome the problem of pollution free disposal of discardable material, and it is particularly a problem to condition for separation the metallic classes of recoverable materials from those that are non-magnetic. Separation along these lines of classifications will bring the benefit of removing from the metallic material those materials which, upon heating of the metallics to melting temperatures, will cause smoke and contamination of the air with noxious fumes. Suppression of the contaminating by-products of metal recovery from old automobiles is a very desirable aim, but its economic and easy attainment has not heretofore been achieved in a satisfactory manner, although many efforts have been made. The present apparatus aims to solve the many difficulties heretofore noted.

DESCRIPTION OF THE DRAWINGS

The separator apparatus of this invention is shown in the accompanying drawings, wherein.

DESCRIPTION OF THE APPARATUS

Figure 1:
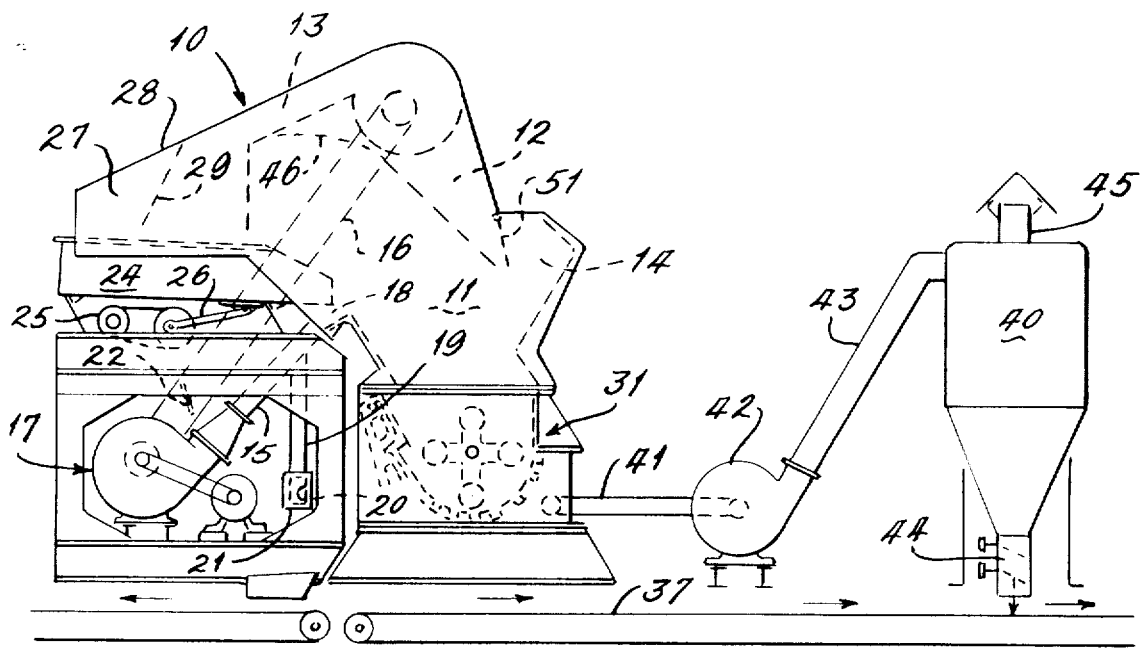
FIG. 1 is a schematic side view of a preferred embodiment of the apparatus by which different classes of materials may be separated from each other.
Figure 2:
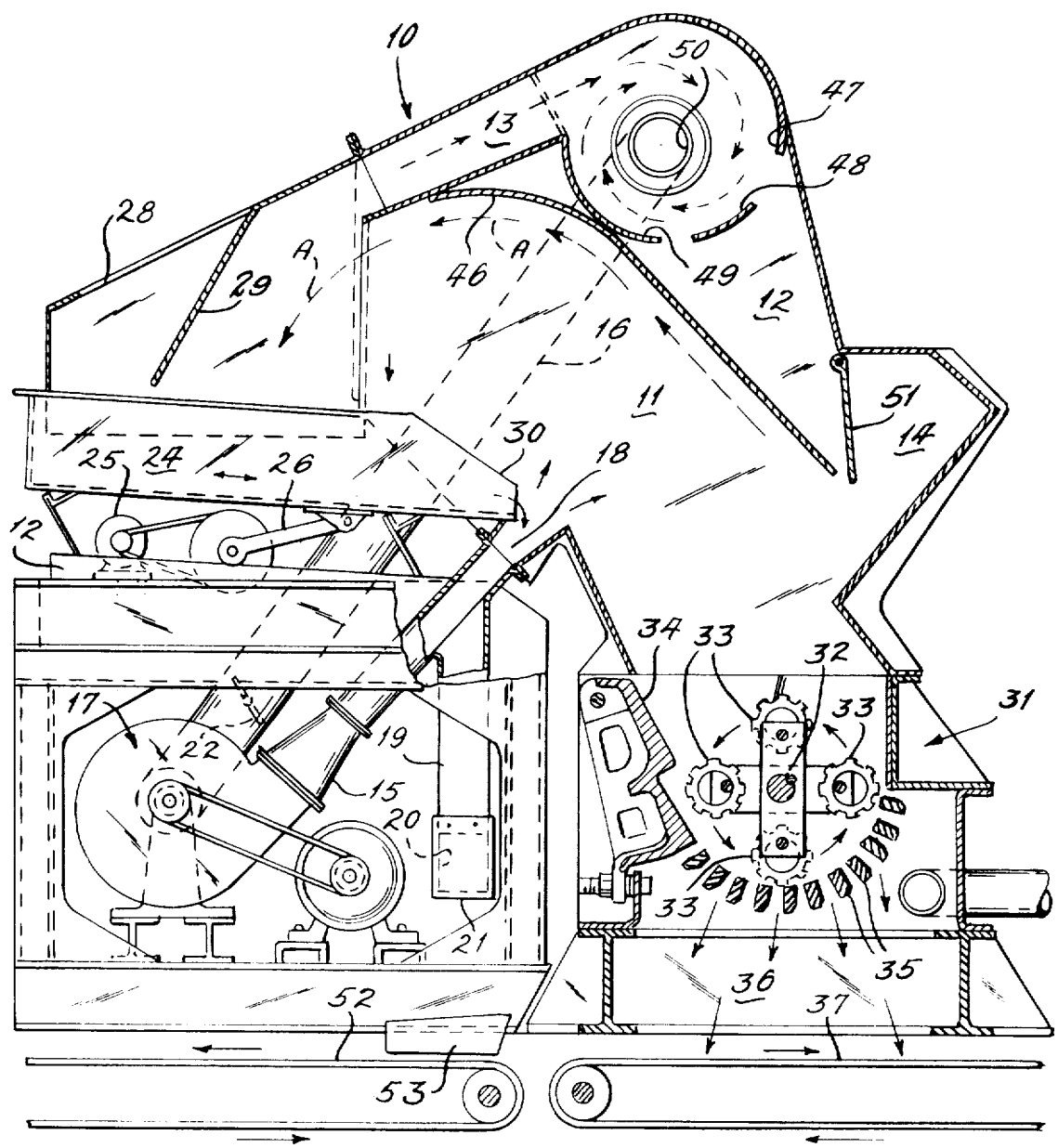
FIG. 2 is a sectional elevational view of portions of the apparatus in FIG. 1 to show details related to the operation thereof.

Referring now to FIGS. 1 and 2 of the drawings, it can be seen that the separator apparatus embodies a suitable housing structure which includes the following components: a sheet metal structure 10 which defines a first chamber 11 and a second chamber 12 which are in communication through a flow passage 13 and a passage 14. The chambers 11 and 12 are also in communication through an air flow discharge conduit 15 and a suction conduit 16 of an air moving blower 17. The blower discharge conduit 15 has a discharge orifice 18 open to chamber 11 and a collecting trap 19 opening off a side of the conduit 15 and terminating in a dump port 20 controlled by a flexible valve 21 to prevent ingress of ambient air and allow material discharge when the weight thereof overcomes the resistance of the valve 21. The suction conduit 16 for blower 17 is provided with a control valve 22 to select the desired rate or volume of air flow in the discharge conduit 15 such that material separation can be accomplished, as will be explained presently.

The apparatus 10 includes material agitating means 24 in the form of a vibratory conveyor having motor means 25 driving an eccentric arm 26 which initiates the vibratory agitation and separation of the material deposited in the conveyor at the feed hopper 27 which is defined by side sheets 28 and a transverse baffle 29. The material received at this hopper 27 is usually heavily mixed with dirt, and includes shredded waste metals mechanically mixed with glass, fabric, plastic and paper, to name a few. The agitation in conveyor 24 acts to knock the dirt off of the other material and settle the heavier classifications out of the lighter classifications. This initial separation prepares the material as it vibrates off the end 30 of conveyor 24 to be dropped into the stream of air issuing from the orifice 18. At this zone of the chamber 11 the heavy material such as the metallic components fall into the conduit 15 and are separated by gravity into the trap 19. The lighter weight material and dirt are suspended in the air stream and are blown into chamber 11 for subsequent treatment.

As shown in FIGS. 1 and 2, the bottom of chamber 11 is open to a material separating unit 31 in the form of a ring hammer mill having a rotor 32 equipped with ring hammers 33, breaker bar 34 and an exit formed by closely spaced grid bars 35 arranged about a segment of the arc of travel of the hammers 33. The mill 31 has a waste outlet 36 open to a material collecting conveyor belt 37 which conveys the waste material away to a suitable collection station, not necessary to show. The outlet space 36 of the mill 31 is maintained at sub-atmospheric pressure by a conventional cyclone separator unit 40 connected by the suction conduit 41 of a blower 42. The blower 42 is connected by conduit 43 to the separator 40. The separator collects the extremely fine waste material for discharge at the outlet port 44 while the air is exhausted at the hooded top port 45.

The operation of the blower 42 causes a suction effect in the chamber 11 to draw the materials pulverized in the mill 31 where it is separated and reduced by the rotor hammers 33 to a fineness capable of passing through the grate bars 35. The heavier material such as metallic components which are not reduced sufficiently to pass through the grate openings are carried by the rotor 32 around the mill and are forceably flung back in the chamber 11 at high velocity. These high velocity components shoot upwardly in chamber 11 and are guided by the curved wall 46 back to the conveyor 24 for recycling. The path of the high velocity recycled material is depicted by the arrows A in FIG. 2, and the baffle 29 assists in directing the material back to the conveyor 24.

The movement of high velocity material is accompanied by a certain quantity of other lighter weight material in the upper portion of chamber 11 passing into the space adjacent the baffle 29 where the suction effect of the blower 17 in passage 13 draws the light weight material into the second chamber 12. Chamber 12 is provided with a plurality of spaced walls 47, 48 and 49 which cause a cyclonic action to occur. The cyclonic action separates the lightweight material and substantially clean air is drawn into the port 50 leading to the suction conduit 15. The spaced walls 47, 48 and 49 cause a vortex centrifuge effect in chamber 12 to throw out substantially all of the solids into the bottom zone of chamber 12. The chamber 12 is provided with a flexible diaphragm valve 51 over the outlet from chamber 12 to the material return passage 14 which is open to the bottom zone of chamber 11 adjacent the mill 31. Recycling of the waste material moving down through the passage 14 is assisted by the pressure drop across the mill 31 created by the blower 42, as before described.

The action of the separating mill 31 is important as it recycles the metallic components of the waste material back to the vibratory conveyor 24 where such metallic material again falls into the orifice 18 of the conduit 15 and is captured in the trap 19. When a sufficient weight of metallic material accumulates in the trap 19 it opens the valve 20 and falls onto collecting conveyor 52 at the hopper device 53. The material on conveyor 52 is conducted to a suitable collection station (not shown). This material constitutes the useful product output of the present apparatus.

Figure 3:
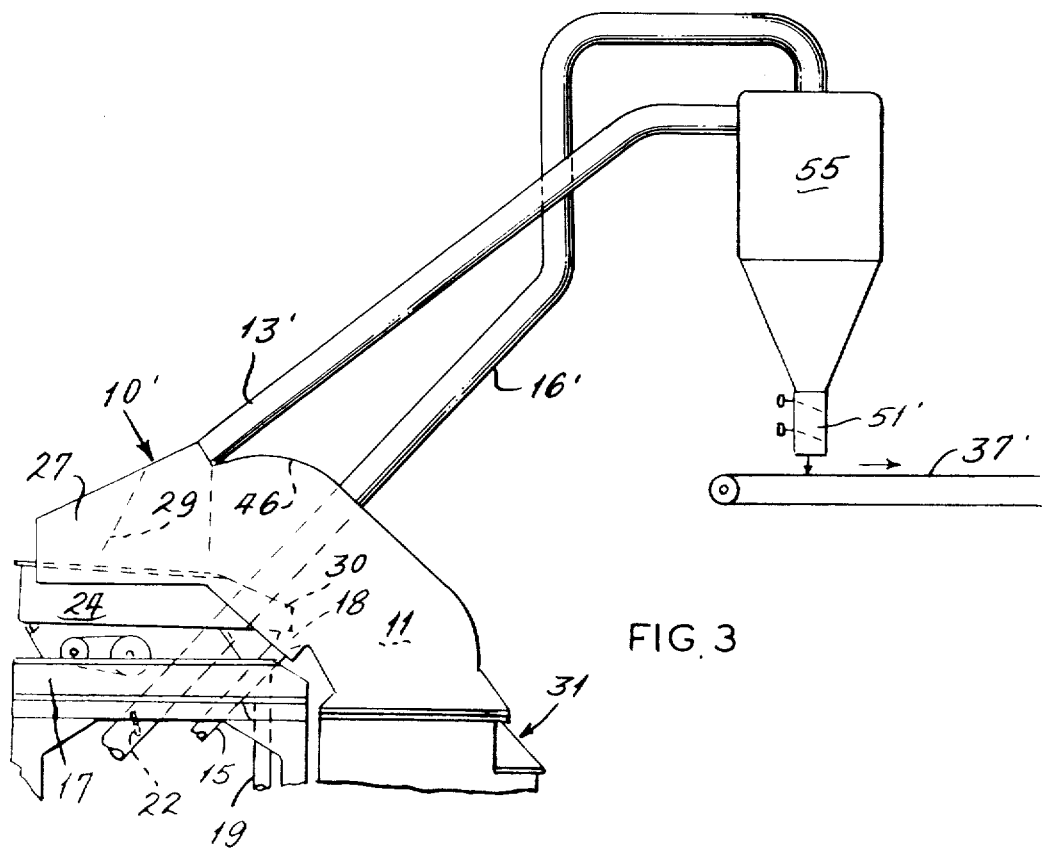
FIG. 3 is a fragmentary view similar to FIG. 1, but showing an alternate arrangement for the apparatus.

A modified form of the present apparatus is seen at 10' in FIG. 3. In this form of the apparatus, the chamber 12 is eliminated and a cyclone separator 55 constitutes the second chamber. Thus, the modified unit 10' is provided with a flow passage 13' leading to the intake of the separator chamber 55 and the suction of the separator 55 is a conduit 16' leading to the suction side of blower 17 in the housing 17' of the unit 10'. The housing 17' is only partly shown as it conforms in detail with the disclosure of FIGS. 1 and 2. The apparatus of FIG. 3 performs in substantially the manner heretofore described, except that the waste material collected in the separator 55 is discharged through outlet port 51' onto conveyor 37'. The waste material discharged from the separating unit 31 of apparatus 10' is collected on the conveyor 37 previously shown and in the manner described in connection with FIG. 2.

OPERATION OF THE APPARATUS

The apparatus shown at 10 and 10' is operative to collect non-ferrous or non-magnetic metals which can be recovered for reuse by heating them at different temperatures and running off the molten metals. It is important to this recovery process to eliminate dirt, rubber, glass and other contaminants so as to prevent smoke, fumes and pollutants. The method practiced by the present apparatus is to subject the scrap and shredded material to the action of a vibratory conveyor 24 and to discharge the agitated material directly into the air stream at orifice 18 of blower 17. The light fluffy material, such as rubber, cotton, plastics and dirt, is blown into chamber 11 and the heavy metallic components fall counter to the air stream into conduit 15 and thence into trap 19. The fluffy material is partly drawn down into the separating mill 31 where it is ground up and discharged onto conveyor 37. Part of the fluffy material is drawn off at passage 13 (or 13' in FIG. 3) and subjected to a vortex action in chamber 12 (or cyclone 55 of FIG. 3) so it may be separated out in a second separation step to clean the air sucked back to blower 17 through conduit 16 (or conduit 16' in FIG. 3).

The control valve 22 in suction conduit 16 (or 16') is provided to regulate the velocity of the air flow in the discharge conduit 15 so that the highest percentage of metallic recovery is obtained. It has been determined that a setting of the valve 22 for a blower output of approximately 4000 to 5000 cubic feet per minute gives the best results. Any metallic components entrained by the air stream at orifice 18 will be carried into chamber 11 and sink into the separator mill 31 where the hammering and separating action of the ring hammers 33 will disengage the metal from the other waste material. The hammers 33 will cause the metal to be flung at high velocity through chamber 11 and along the guide wall 46 to return to the vibratory conveyor 24 for recycling. The modified apparatus of FIG. 3 performs the equivalent method of separating dirt and unwanted materials from the metallic components sought as the useful product output from the present apparatus.

While recovery of useful metallic product is important, the densifying of waste material and dirt is also important. The waste material separates out in three zones in the apparatus of FIG. 2 and in two zones in the apparatus of FIG. 3. In each case the waste and dirt is ground up in the mill to a fineness sufficient to pass through the openings in the grate bars 35 (of the order of ¼ inch). This is advantageous as the cost of dumping waste material is in many places based on the number of loads or cubic yards dumped, rather than on the basis of weight. Thus, the mill 31 reduces the dirt and waste to about two-thirds the volume when not milled.

What is claimed is:

1. Material separating apparatus comprising: a material receiver having a discharge end; a chamber adjacent said receiver discharge end; an air flow conduit having an orifice open to said chamber at a zone spaced from said discharge end, said discharge end being aligned to discharge material in line to enter said air flow conduit; blower means to supply air to said air flow conduit to disperse lightweight material from heavier material discharged from said receiver discharge end; material reducing means open to said chamber to receive a portion of the material dispersed in the chamber by the air flow; vortex air cleaning means having an inlet communicating with said chamber at a zone remote from said material reducing means, said air cleaning means having a cleaned air outlet connected to said blower means to direct substantially clean air thereto; and means open to said air flow conduit to collect material fall-out entering said air flow conduit in counter current movement to the air flow, said material reducing means and air cleaning means separating out and reducing material failing to fall out at said orifice of the air flow conduit.

2. The material separating apparatus of claim 1 wherein means is connected to said chamber through said material reducing means to reduce the pressure in said chamber below atmosphere, and said vortex air cleaning means communicates with said chamber through said remote inlet in opposition to said pressure reducing means.

3. The material separating apparatus of claim 1 wherein said vortex cleaning means has an outlet opening to said chamber adjacent said material reducing means, and material separated by said vortex means from the air flow is fed to said material reducing means through said outlet opening to said chamber adjacent said material reducing means.

4. The material separating apparatus of claim 1 wherein said material receiver is vibrated to initiate separation of material and said discharge end is located in generally vertically spaced relation over said air flow conduit orifice, whereby fall-out material enters said orifice against the air flow issuing therefrom.

5. Material reclaiming apparatus comprising:
(a) a pair of chambers in which material separation occurs, said chambers being in communication;
(b) air moving means having a discharge passage open to a first chamber and a suction passage communicating with the second chamber;
(c) material agitating means operable to initiate material separation and feed such material into said first chamber in position aligning the feed of the material over said air discharge passage;
(d) means in one of said passages of said air moving means to regulate the flow of air in said discharge passage to establish a condition in which the heavier material moves against the flow and the lighter material is contained by the flow in said first chamber;

(e) material separating means connected into said first chamber to receive the material conveyed from said discharge passage, said separating means operating to disassociate the lighter material from the heavier material and recycle the heavier material through said first chamber to said material agitating and feeding means;

(f) means in said second chamber to substantially clear the air of entrained material; and (g) means connected to said discharge passage to collect the heavier material moving against the air flow.

6. The material reclaiming apparatus of claim 5 wherein said second chamber is provided with spaced arcuate walls to create a vortex action and separation of entrained material, and passage means connects said second chamber to said first chamber adjacent said material separating means to recycle such material.

7. The material reclaiming apparatus of claim 5 and including means connected to said separating means to lower the pressure thereat below atmospheric pressure.

8. The material reclaiming apparatus of claim 5 wherein said air flow regulating means is adjusted to provide air flow in said air moving discharge passage to a velocity excluding from said discharge passage substantially all material except an optimum quantity of reclaimable material which is heavy enough to move countercurrent to the air flow in said discharge passage.

9. The material reclaiming apparatus of claim 5 wherein said second chamber is constituted by a cyclone separator.

10. Material separator apparatus including a pair of chambers, a material grinding device connected to a first chamber and having a grate to pass certain sized constituents of the material reduced by the action of said device, a material agitating and feeding conveyor having a delivery end feeding material into said first chamber, said conveyor having a remote portion in communication with said first chamber and said second chamber, an air moving blower having a suction connection with said second chamber and a delivery connection with said first chamber adjacent said conveyor feeding end to deliver a flow of air into the material and disperse such material in said first chamber, means to control the air flow to said first chamber to a level such that heavy constituents of the material fall into said delivery connecton, collection means for said heavy constituents open to said delivery connection, said grinding device returning unground constituents through said first chamber to said remote conveyor portion for recycling, and means in said second chamber effective for cleaning lightweight constituents from the material passing from said first to said second chamber, the air passing through said suction connection being substantially free of material.

References Cited

UNITED STATES PATENTS

| | | | |
|---|---|---|---|
| 2,233,728 | 3/1941 | Bell | 241—59 |
| 2,957,633 | 10/1960 | Andreas | 241—186 R X |
| 3,010,664 | 11/1961 | Waenerlund | 241—57 X |
| 3,055,597 | 9/1962 | Mund | 241—186 R X |
| 3,082,963 | 3/1963 | Gondard | 241—47 X |
| 3,540,665 | 11/1970 | Snock | 241—73 |

GRANVILLE Y. CUSTER, Jr., Primary Examiner

U.S. Cl. X.R.

241—57, 73, 81, 186 R